(12) United States Patent
Hapsari et al.

(10) Patent No.: US 8,797,956 B2
(45) Date of Patent: Aug. 5, 2014

(54) MOBILE COMMUNICATION SYSTEM

(75) Inventors: Wuri Andarmawanti Hapsari, Yokosuka (JP); Anil Umesh, Yokohama (JP); Hideaki Takahashi, Yokohama (JP); Mikio Iwamura, Tokyo (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 159 days.

(21) Appl. No.: 13/266,488

(22) PCT Filed: Apr. 19, 2010

(86) PCT No.: PCT/JP2010/056924
§ 371 (c)(1),
(2), (4) Date: Jan. 3, 2012

(87) PCT Pub. No.: WO2010/125937
PCT Pub. Date: Nov. 4, 2010

(65) Prior Publication Data
US 2012/0093081 A1    Apr. 19, 2012

(30) Foreign Application Priority Data

Apr. 27, 2009 (JP) ................................ P2009-108560

(51) Int. Cl.
*H04W 4/00* (2009.01)
(52) U.S. Cl.
USPC .......................................................... 370/328
(58) Field of Classification Search
USPC ........................... 370/328, 329, 315, 311, 338
See application file for complete search history.

(56) References Cited

U.S. PATENT DOCUMENTS

| | | | | |
|---|---|---|---|---|
| 2008/0267148 | A1* | 10/2008 | Speight | 370/338 |
| 2009/0252072 | A1* | 10/2009 | Lind et al. | 370/311 |
| 2010/0260096 | A1* | 10/2010 | Ulupinar et al. | 370/315 |
| 2010/0260126 | A1* | 10/2010 | Ulupinar et al. | 370/329 |
| 2010/0272007 | A1* | 10/2010 | Shen et al. | 370/315 |

OTHER PUBLICATIONS

Huawei, "Consideration for Relay," 3GPP TSG RAN WG2 Meeting #65bis, R2-092179, Mar. 23-27, 2009, 5 pages.
Kubo, et al., "Path Management of SCTP to Eliminate Single Point of Failure in Multihoming" ("SCTP ni Okeru Tan'itsuten Shogai Kaihi no Teian to Jisso"), IEICE Technical Report IN 2002-216, Feb. 27, 2003, 8 pages.
NTT Docomo, Inc., "On S1 termination and Protocol Stack in Relay Architecture," 3GPP TSG-RAN2 #66, R2-093283, May 4-8, 2009, 8 pages.

(Continued)

*Primary Examiner* — Albert T Chou
(74) *Attorney, Agent, or Firm* — Osha Liang LLP

(57) ABSTRACT

A radio base station includes a mobile communication system that sends and receives control signals between a mobile station and a mobile switching center via a first radio bearer, a second radio bearer, and a wired bearer. The relay node includes a first radio bearer function, a second radio bearer function, an IP layer function, an SCTP layer function, and an application layer function. The radio base station includes a second radio bearer function, a wired bearer function, and an IP layer function. The mobile switching center includes a wired bearer function, IP layer function, SCTP layer function, and an application layer function. Keep-alive processing is performed between the SCTP layer function of the relay node and the SCTP layer function of the mobile switching center. Security processing is performed between the IP layer function of the relay node and the IP layer function of the mobile switching center.

1 Claim, 7 Drawing Sheets

(56) References Cited

OTHER PUBLICATIONS

3GPP TS 36.413 V10.3.0, Sep. 2011, "3rd Generation Partnership Project; Technical Specification Group Radio Access Network; Evolved Universal Terrestrial Radio Access Network (E-UTRAN); S1 Application Protocol (S1AP) (Release 10)," 255 pages.

International Search Report issued in PCT/JP2010/056924, mailed on May 18, 2010, with translation, 4 pages.

3GPP TSG-RAN WG3 #63bis, R3-090702, Qualcomm Europe, "Preference for Relay Operation in LTE-A"; Seoul, Korea, Mar. 23-27, 2009 (6 pages).

Extended European Search Report for European Application No. 10769636.1 dated May 2, 2012 (6 pages).

Russian Office Action for Russian Patent Application No. 2011145536/08(068186), mailing date Feb. 21, 2013, with English translation thereof (8 pages).

\* cited by examiner

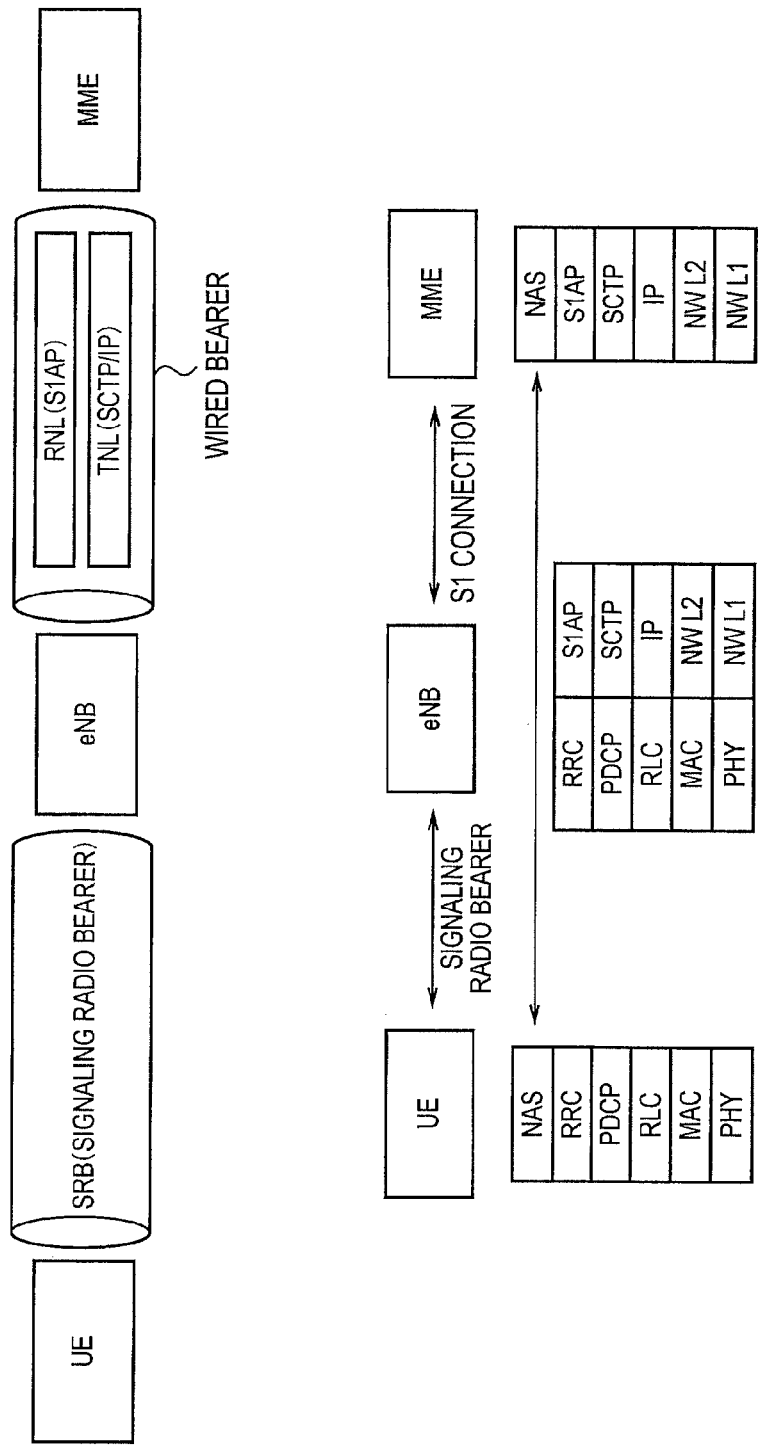

ary of the present invention, provides a mobile communication system in which the mobile station is able to send and receive control signals with the mobile switching center via a plurality of devices provided with the functions of the radio base station.

MOBILE COMMUNICATION SYSTEM

BACKGROUND OF INVENTION

1. Technical Field

The present invention relates to a mobile communication system.

2. Background Art

FIG. 7 illustrates the bearer configuration and the protocol stack for sending a control signal between a mobile station UE and a mobile switching center MME in the LTE scheme (Release. 8) as defined by the 3GPP.

As illustrated in FIG. 7, as bearers for the C-plane, a signaling radio bearer (SRB; RRC connection) is provided between the mobile station UE and the radio base station eNB, and a wired bearer (S1 connection) is provided between the radio base station eNB and the mobile switching center MME.

As radio bearer functions of setting the radio bearer with the radio base station eNB, the mobile station UE further includes a physical (PHY) layer function, an MAC (Media Access Control) layer function, an RLC (Radio Link Control) layer function, a PDCP (Packet Data Convergence Protocol) layer function, and an RRC (Radio Resource Control) layer function.

As radio bearer functions of setting the radio bearer with the mobile station UE, the radio base station eNB also includes a physical (PHY) layer function, an MAC layer function, an RLC layer function, a PDCP layer function, and an RRC layer function.

Further, as wired bearer functions of setting the wired bearer with the mobile switching center MME, the radio base station eNB includes a network layer 1 (NW L1) function, a network layer 2 (NW L2) function, an IP (Internet Protocol) layer function, an SCTP (Stream Control Transmission Protocol) layer function, and an S1AP layer function.

Similar, as wired bearer functions of setting the wired bearer with the radio base station eNB, the mobile switching center MME includes a network layer 1 (NW L1) function, a network layer 2 (NW L2) function, an IP layer function, an SCTP layer function, and an S1AP layer function.

As illustrated in FIG. 7, the control signals (NAS (Non Access Stratum) signals and S1AP signals) are configured to be sent and received between the mobile station UE and the mobile switching center MME on the radio bearers and wired bearers described above.

In a mobile communication system of the LTE-Advanced scheme, which is the communication scheme that is the next-generation of the LTE scheme, a connection to "relay nodes RN" can be established between the mobile station UE and the radio base station eNB.

However, the conventional mobile communication system has been problematic in that, when the relay nodes RN are employed, the bearer configuration and protocol stack for sending the control signals mentioned above cannot be applied, because there is no intention for the mobile station UE to send and receive control signals with the mobile switching center MME via a plurality of devices provided with the functions of the radio base station eNB.

SUMMARY OF INVENTION

One or more embodiments of the present invention may provide a mobile communication system in which the mobile station is able to send and receive control signals with the mobile switching center via a plurality of devices provided with the functions of the radio base station.

The first feature of the present invention is summarized in that a mobile communication system configured to send and receive control signals between a mobile station and a mobile switching center via a first radio bearer that is set between the mobile station and a relay node, a second radio bearer that is set between the relay node and a radio base station, and a wired bearer that is set between the radio base station and the mobile switching center, the relay node comprises a first radio bearer function for setting the first radio bearer, a second radio bearer function for setting the second radio bearer, an IP layer function provided as an upper layer function of the second radio bearer function, an SCTP layer function provided as an upper layer function of the IP layer function and an application layer function provided as an upper layer function of the SCTP layer function the radio base station comprises, a second radio bearer function for setting the second radio bearer, a wired bearer function for setting the wired bearer and an IP layer function provided as an upper layer function of the second radio bearer function and the wired bearer function, the mobile switching center comprises, a wired bearer function for setting the wired bearer, an IP layer function provided as an upper layer function of the wired bearer function, an SCTP layer function provided as an upper layer function of the IP layer function and an application layer function provided as an upper layer function of the SCTP layer function, the control signals are configured to be sent and received on a session terminating between the application layer function of the relay node and the application layer function of the mobile switching center, keep-alive processing for the session is configured to be performed between the SCTP layer function of the relay node and the SCTP layer function of the mobile switching center, and security processing is configured to be performed between the IP layer function of the relay node and the IP layer function of the mobile switching center.

The second feature of the present invention is summarized in that a mobile communication system configured to send and receive control signals between a mobile station and a mobile switching center via a first radio bearer that is set between the mobile station and a relay node, a second radio bearer that is set between the relay node and a radio base station, and a wired bearer that is set between the radio base station and the mobile switching center, the relay node comprises, a first radio bearer function for setting the first radio bearer, a second radio bearer function for setting the second radio bearer, an SCTP layer function provided as an upper layer function of the second radio bearer function and an application layer function provided as an upper layer function of the SCTP layer function, the radio base station comprises, a second radio bearer function for setting the second radio bearer, a wired bearer function for setting the wired bearer and an IP layer function provided as an upper layer function of the wired bearer function, the mobile switching center comprises, a wired bearer function for setting the wired bearer, an IP layer function provided as an upper layer function of the wired bearer function, an SCTP layer function provided as an upper layer function of the IP layer function and an application layer function provided as an upper layer function of the SCTP layer function, the control signals are configured to be sent and received over a session terminating between the application layer function of the relay node and the application layer function of the mobile switching center, keep-alive processing for the session is configured to be performed between the SCTP layer function of the relay node and the SCTP layer function of the mobile switching center, and security processing is configured to be performed between the second radio bearer function of the relay node and the second radio bearer function of the radio base station, as well as between the IP layer function of the radio base station and the IP layer function of the mobile switching center.

The third feature of the present invention is summarized in that a mobile communication system configured to send and receive control signals between a mobile station and a mobile switching center via a first radio bearer that is set between the mobile station and a relay node, a second radio bearer that is set between the relay node and the radio base station, and a wired bearer that is set between the radio base station and the mobile switching center, the relay node comprises, a first radio bearer function for setting the first radio bearer, a second radio bearer function for setting the second radio bearer, an IPSec layer function provided as an upper layer function of the second radio bearer; and an application layer function provided as an upper layer function of the IPSec layer function, the radio base station comprises, a second radio bearer function for setting the second radio bearer, a wired bearer function for setting the wired bearer, an IP layer function provided as an upper layer function of the wired bearer function and an SCTP layer function provided as an upper layer function of the IP layer function, the mobile switching center comprises, a wired bearer function for setting the wired bearer, an IP layer function provided as an upper layer function of the wired bearer function, an SCTP layer function provided as an upper layer function of the IP layer function, an IPSec layer function provided as an upper layer function of the SCTP layer function and an application layer function provided as an upper layer function of the IPSec layer function, the control signals are configured to be sent and received on a session terminating between the application layer function of the relay node and the application layer function of the mobile switching center, keep-alive processing for the session is configured to be performed between the second radio bearer function of the relay node and the second radio bearer function of the radio base station, and also between the SCTP layer function of the radio base station and the SCTP layer function of the mobile switching center, and security processing is configured to be performed between the IPSec layer function of the relay node and the IPSec layer function of the mobile switching center.

The fourth feature of the present invention is summarized in that a mobile communication system configured to send and receive control signals between a mobile station and a mobile switching center via a first radio bearer that is set between the mobile station and a relay node, a second radio bearer that is set between the relay node and the radio base station, and a wired bearer that is set between the radio base station and the mobile switching center, the relay node comprises, a first radio bearer function for setting the first radio bearer, a second radio bearer function for setting the second radio bearer and an application layer function provided as an upper layer function of the second radio bearer function, the radio base station comprises, a second radio bearer function for setting the second radio bearer, a wired bearer function for setting the wired bearer, an IP layer function provided as an upper layer function of the wired bearer function and an SCTP layer function provided as an upper layer function of the IP layer function, and the mobile switching center comprises, a wired bearer function for setting the wired bearer, an IP layer function provided as an upper layer function of the wired bearer function, an SCTP layer function provided as an upper layer function of the IP layer function and an application layer function provided as an upper layer function of the SCTP layer function, the control signals are configured to be sent and received on a session terminating between the application layer function of the relay node and the application layer function of the mobile switching center, keep-alive processing for the session is configured to be performed between the second radio bearer function of the relay node and the second radio bearer function of the radio base station, as well as between the SCTP layer function of the radio base station and the SCTP layer function of the mobile switching center, and security processing is configured to be performed between the second radio bearer function of the relay node and the second radio bearer function of the radio base station, as well as between the IP layer function of the radio base station and the IP layer function of the mobile switching center.

The fifth feature of the present invention is summarized in that a mobile communication system configured to send and receive control signals between a mobile station and a mobile switching center via a first radio bearer that is set between the mobile station and a relay node, a second radio bearer that is set between the relay node and a radio base station, and a wired bearer that is set between the radio base station and the mobile switching center, the relay node comprises a first radio bearer function for setting the first radio bearer, a second radio bearer function for setting the second radio bearer and a first application layer function provided as an upper layer function of the second radio bearer function, the radio base station comprises a second radio bearer function for setting the second radio bearer, a wired bearer function for setting the wired bearer and a first application layer function provided as an upper layer function of the second radio bearer function, and comprises a second application layer function provided as an upper layer function of the wired bearer function, the mobile switching center comprises, a wired bearer function for setting the wired bearer, an IP layer function provided as an upper layer function of the wired bearer function, an SCTP layer function provided as an upper layer function of the IP layer function and a second application layer function provided as an upper layer function of the SCTP layer function, the control signals are configured to be sent and received on a first session terminating between the first application layer function of the relay node and the first application layer function of the radio base station, and on a second session terminating between the second application layer function of the radio base station and the second application layer function of the mobile switching center, keep-alive processing for the first session is configured to be performed between the second radio bearer function of the relay node and the second radio bearer function of the radio base station, keep-alive processing for the second session is configured to be performed between the SCTP layer function of the radio base station and the SCTP layer function of the mobile switching center, and security processing is configured to be performed between the SCTP layer function of the relay node and the second radio bearer function of the radio base station, as well as between the IP layer function of the radio base station and the IP layer function of the mobile switching center.

As has been described above, according to the present invention, provided is a mobile communication system in which the mobile station is able to send and receive control signals with the mobile switching center via a plurality of devices provided with the functions of the radio base station.

BRIEF DESCRIPTION OF THE DRAWINGS

FIG. 7 is a diagram showing the protocol stack in a current mobile communication system.

DETAILED DESCRIPTION (Mobile Communication System According to First Embodiment of the Present Invention)

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. A description will be provided for the mobile communication system according to a first embodiment of the present invention, with reference to FIG. 1 to FIG. 6.

Figure 1:
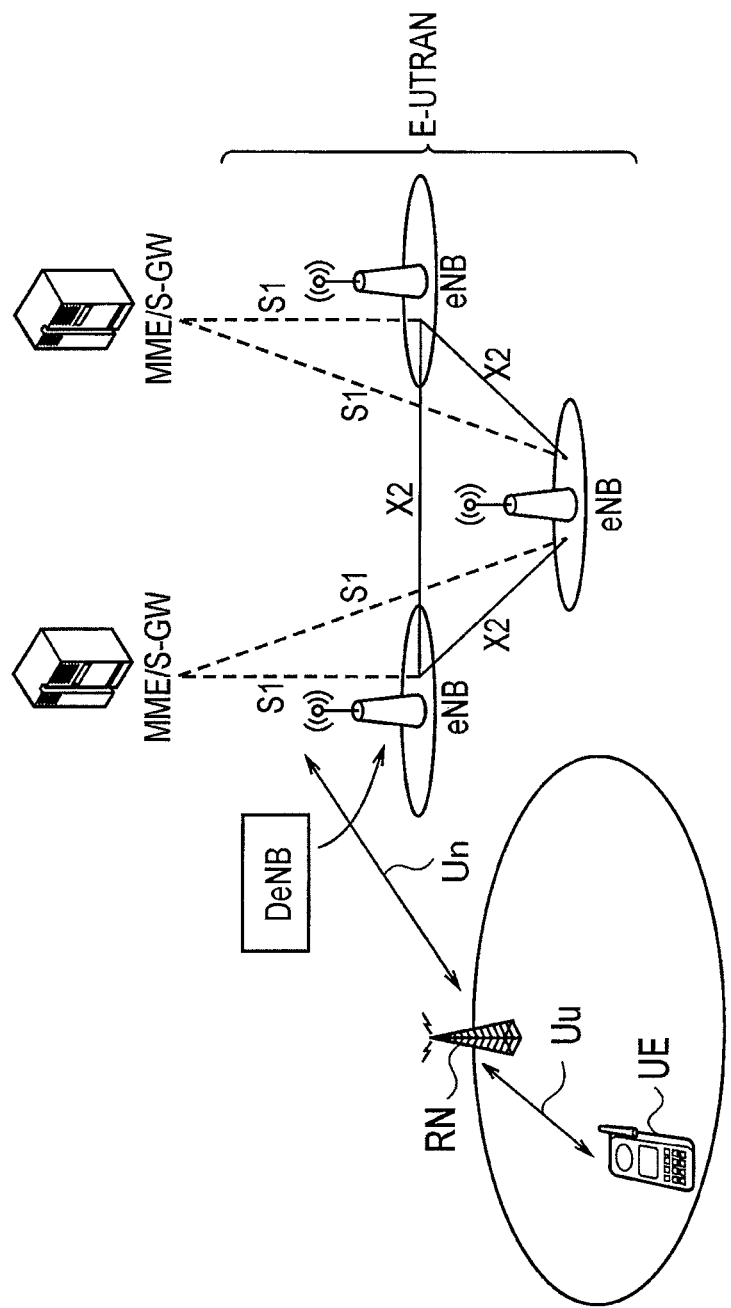
FIG. 1 is a diagram showing the entire configuration of the mobile communication system according to a first embodiment of the present invention.

As illustrated in FIG. 1, the mobile communication system of this embodiment is a mobile communication system in which the LTE-Advanced scheme has been applied, and includes a mobile switching center MME, a gateway device S-GW, a radio base station eNB, and a relay node RN.

As illustrated in FIG. 1, a connection can be established via an S1 interface between the mobile switching center MME and the gateway device S-GW, and the radio base station eNB; the radio base stations eNB can be connected to one another via an X2 interface; a connection can be established between the radio base station eNB and the relay node RN via a Un interface; and a connection can be established between the relay node and the mobile station UE via a Uu interface.

Herein, a radio base station that is connected to the relay node may be called a "DeNB (Donor eNB)".

Figure 2:
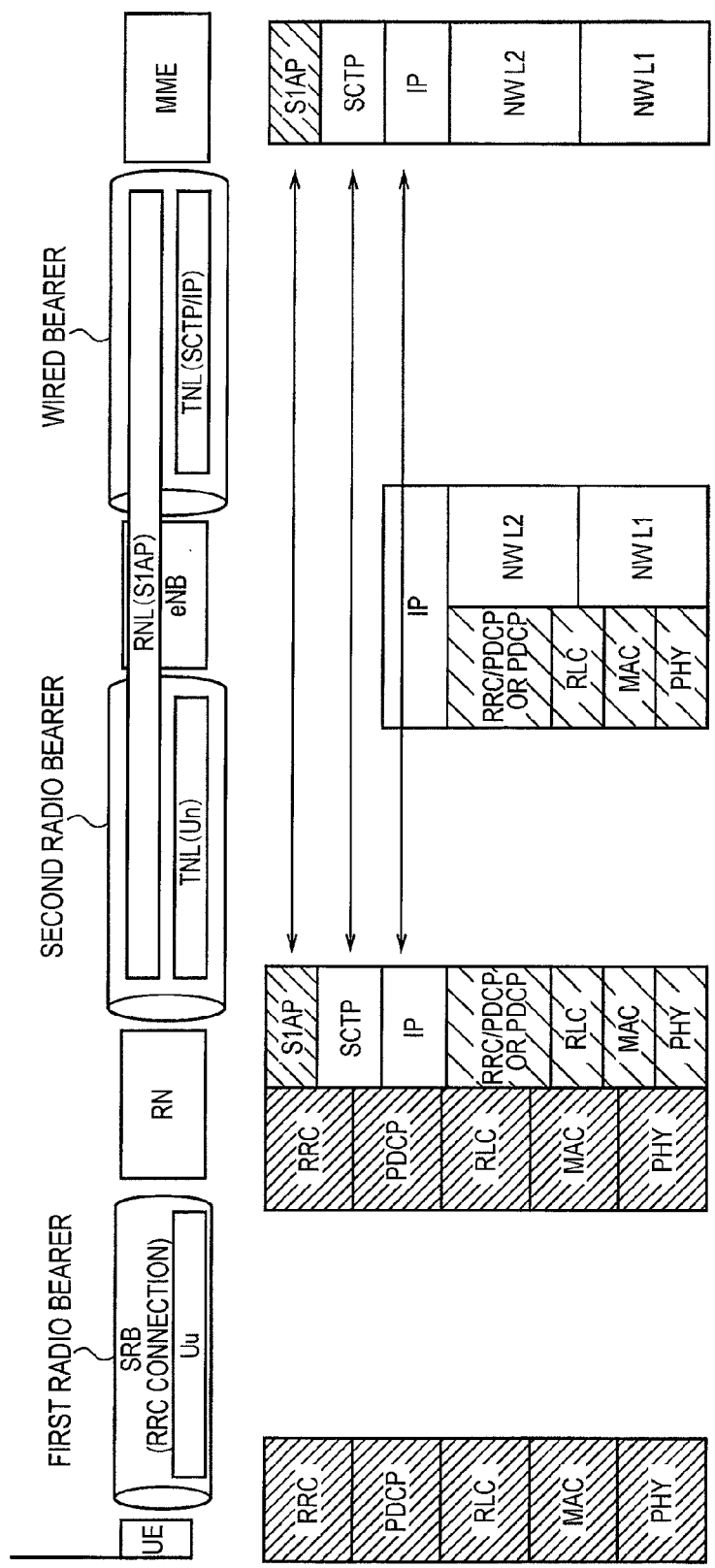
FIG. 2 is a diagram showing the protocol stack in the mobile communication system according to the first embodiment of the present invention.

As illustrated in FIG. 2, the mobile communication system according to this embodiment is configured such that control signals (NAS signals and S1AP signals) are sent and received between the mobile station UE and the mobile switching center MME via a first radio bearer (SRB) that is set between the mobile station UE and the relay node RN, via a second radio bearer (SRB or DRB (Data Radio Bearer)) that is set between the relay node RN and the radio base stations eNB (DeNB), and via a wired bearer that is set between the radio base stations eNB and the mobile switching center MME.

As first radio bearer functions of setting the first radio bearer with the relay node RN, the mobile station UE includes a physical (PHY) layer function, an MAC layer function provided as an upper layer function of the physical (PHY) layer function, an RLC layer function provided as an upper layer function of the MAC layer function, a PDCP layer function provided as an upper layer function of the RLC layer function, and an RRC layer function provided as an upper layer function of the PDCP layer function.

As first radio bearer functions of setting the first radio bearer with the mobile station UE, the relay node RN includes a physical (PHY) layer function, an MAC layer function provided as an upper layer function of the physical (PHY) layer function, an RLC layer function provided as an upper layer function of the MAC layer function, a PDCP layer function provided as an upper layer function of the RLC layer function, and an RRC layer function provided as an upper layer function of the PDCP layer function.

In addition, the relay node RN includes a second radio bearer function for setting the second radio bearer with the radio base stations eNB, an IP layer function provided as an upper layer function of the second radio bearer function, an SCTP layer function provided as an upper layer function of the IP layer function, and an application layer function (S1AP layer function) provided as an upper layer function of the SCTP layer function.

Herein, as second radio bearer functions, the relay node RN includes a physical (PHY) layer function, an MAC layer function provided as an upper layer function of the physical (PHY) layer function, an RLC layer function provided as an upper layer function of the MAC layer function, and a PDCP layer function provided as an upper layer function of the RLC layer function.

Note that as a second radio bearer function, the relay node RN may further include an RRC layer function provided as an upper layer function of the PDCP layer function.

The relay node RN, when not provided with an RRC layer function as a second radio bearer function, may set a DRB with the radio base station eNB as a second radio bearer, and when provided with an RRC layer function as a second radio bearer function, may be configured to set an SRB as a second radio bearer with the radio base station eNB.

The radio base station eNB includes a second radio bearer function for setting the second radio bearer with the relay node RN, a wired bearer function for setting the wired bearer with the mobile switching center MME, and an IP layer function provided as an upper layer function of the second radio bearer function and the wired bearer function.

Herein, as second radio bearer functions, the radio base station eNB includes a physical (PHY) layer function, an MAC layer function provided as an upper layer function of the physical (PHY) layer function, an RLC layer function provided as an upper layer function of the MAC layer function, and a PDCP layer function provided as an upper layer function of the RLC layer function.

Note that as a second radio bearer function, the radio base station eNB may further include an RRC layer function provided as an upper layer function of the PDCP layer function.

The radio base station eNB, when not provided with an RRC layer function as a second radio bearer function, may set a DRB with the relay node RN as a second radio bearer, and when provided with an RRC layer function as a second radio bearer function, may be configured to set an SRB as a second radio bearer with the relay node RN.

Also, the radio base station eNB includes a network layer 1 (NW L1) function and a network layer 2 (NW L2) function, as wired bearer functions.

The mobile switching center MME includes a wired bearer function for setting the wired bearer with the radio base station eNB, an IP layer function provided as an upper layer function of the wired bearer function, an SCTP layer function provided as an upper layer function of the IP layer function, and an application layer function (S1AP layer function) provided as an upper layer function of the SCTP layer function.

Herein, the mobile switching center MME includes a network layer 1 (NW L1) function and a network layer 2 (NW L2) function as wired bearer functions.

Herein, the control signals (S1AP signals) are configured to be sent and received on an RNL (Radio Network Layer) session (S1AP) terminating between the application layer function (S1AP layer function) of the relay node RN and the application layer function (S1AP layer function) of the mobile switching center MME.

Also, keep-alive processing for the RNL session (S1AP) is configured to be performed between the SCTP layer function of the relay node RN and the SCTP layer function of the mobile switching center MME.

Security processing is configured to be performed between the IPSec function on the IP layer of the relay node RN and the IPSec function on the IP layer of the mobile switching center MME.

Herein, the IP layer function of the radio base station eNB is configured to perform IP routing processing for IP packets sent by means of the IP layer function of the relay node RN and IP packets sent by means of the IP layer function of the mobile switching center MME.

According to the mobile communication system of this embodiment, it is possible to implement a configuration in which the mobile station sends and receives control signals with the mobile switching center MME via the plurality of devices (the relay node RN and the radio base stations eNB) provided with the functions of the radio base stations eNB, without performing a major renovation of the protocol stack as used in the mobile communication system of the LTE scheme.

Moreover, according to the mobile communication system of this embodiment, it is possible to perform keep-alive (vital monitoring) processing for the RNL session between the relay node RN and the mobile switching center MME and the lower layer paths, directly between the SCTP layer function of the relay node RN and the SCTP layer function of the mobile switching center MME.

(Mobile Communication System According to Second Embodiment of the Present Invention)

Figure 3:
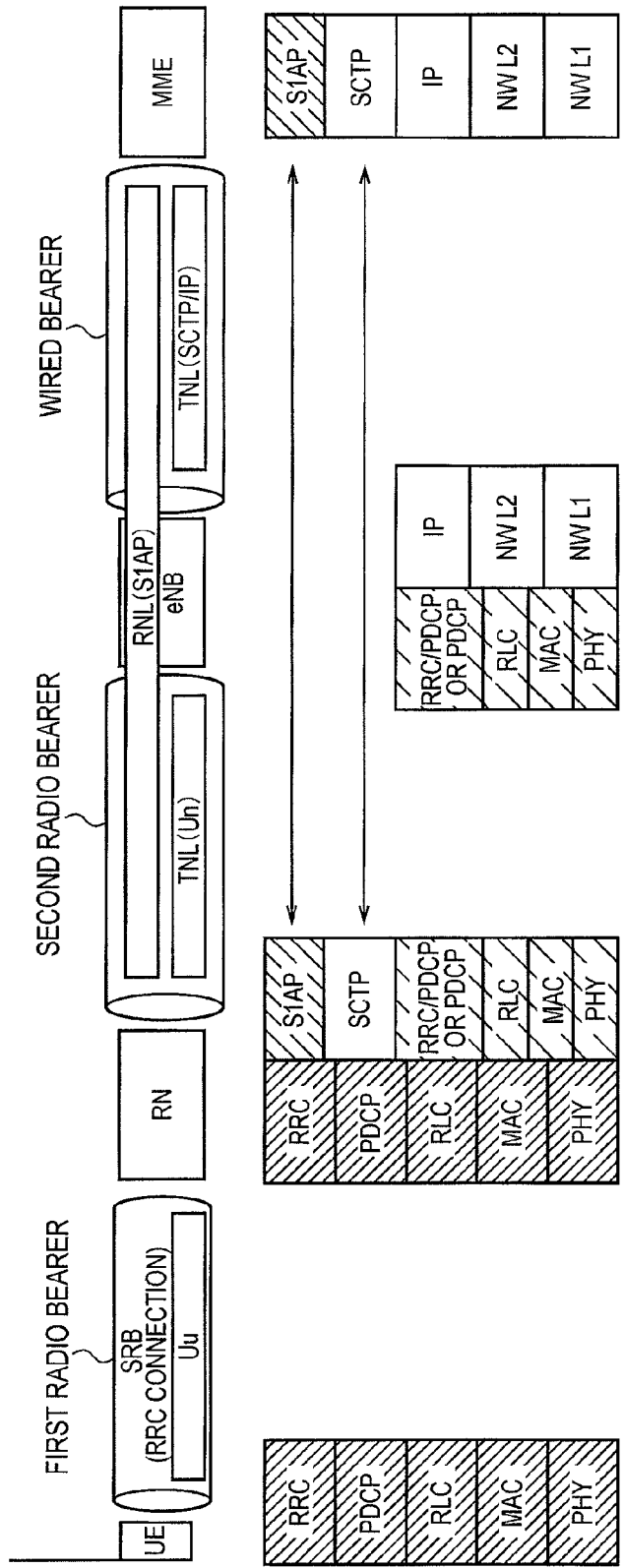
FIG. 3 is a diagram showing the protocol stack in the mobile communication system according to a second embodiment of the present invention.

A description will be provided for the mobile communication system according to a second embodiment of the present invention, with reference to FIG. 3. The mobile communication system according to the second embodiment of the present invention will be described below by focusing on the points of difference with the mobile communication system according to the first embodiment as described above.

As illustrated in FIG. 3, the relay node RN includes a first radio bearer function for setting the first radio bearer with the mobile station UE, a second radio bearer function for setting the second radio bearer with the radio base station eNB, an SCTP layer function provided as an upper layer function of the second radio bearer function, and an application layer function provided as an upper layer function of the SCTP layer function.

The radio base station eNB includes a second radio bearer function for setting the second radio bearer with the relay node RN, a wired bearer function for setting the wired bearer with the mobile switching center MME, and an IP layer function provided as an upper layer function of the wired bearer function.

The mobile switching center MME includes a wired bearer function for setting the wired bearer with the radio base station eNB, an IP layer function provided as an upper layer function of the wired bearer function, an SCTP layer function provided as an upper layer function of the IP layer function, and an application layer function (S1AP layer function) provided as an upper layer function of the SCTP layer function.

Herein, control signals (S1AP signals) are configured to be sent and received on the RNL session (S1AP) terminating between the application layer function (S1AP layer function) of the relay node RN and the application layer function (S1AP layer function) of the mobile switching center MME.

Also, keep-alive processing for the RNL session (S1AP) and the lower layer paths thereof is configured to be performed between the SCTP layer function of the relay node RN and the SCTP layer function of the mobile switching center MME.

Security processing is configured to be performed between the second radio bearer function of the relay node RN and the second radio bearer function of the radio base station eNB, and between the IPSec function on the IP layer of the radio base station eNB and the IPSec function on the IP layer of the mobile switching center MME.

According to the mobile communication system of this embodiment, it is possible to implement a configuration in which the mobile station sends and receives control signals with the mobile switching center MME via the plurality of devices (the relay node RN and the radio base stations eNB) provided with the functions of the radio base stations eNB, without performing a major renovation of the protocol stack as used in the mobile communication system of the LTE scheme.

Moreover, according to the mobile communication system of this embodiment, it is possible to perform keep-alive (vital monitoring) processing for the RNL session and the lower layer paths thereof, directly between the SCTP layer function of the relay node RN and the SCTP layer function of the mobile switching center MME.

(Mobile Communication System According to Third Embodiment of the Present Invention)

Figure 4:
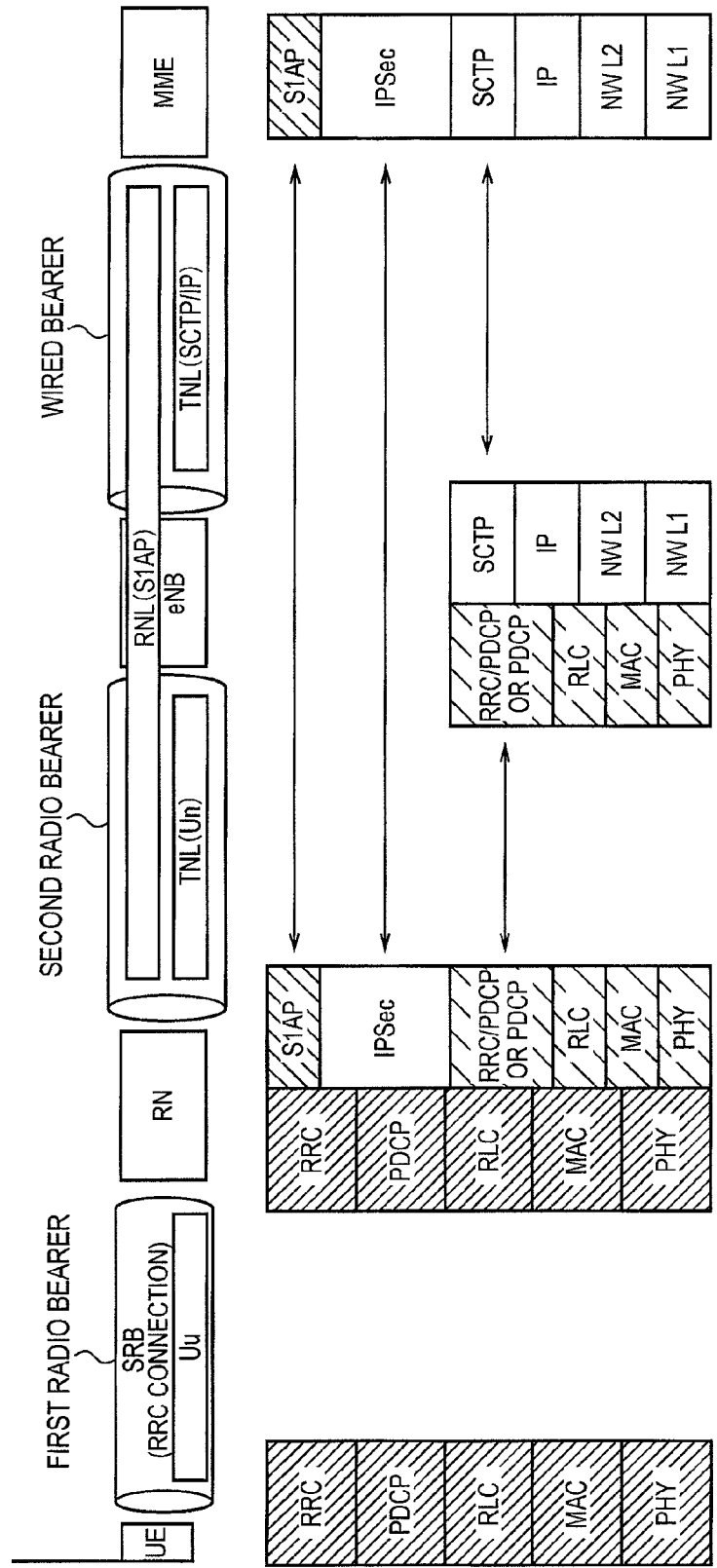
FIG. 4 is a diagram showing the protocol stack in the mobile communication system according to a third embodiment of the present invention.

A description will be provided for the mobile communication system according to a third embodiment of the present invention, with reference to FIG. 4. The mobile communication system according to the third embodiment of the present invention will be described below by focusing on the points of difference with the mobile communication system according to the first embodiment as described above.

As illustrated in FIG. 4, the relay node RN includes a first radio bearer function for setting the first radio bearer with the mobile station UE, a second radio bearer function for setting the second radio bearer with the radio base station eNB, an IPSec layer function provided as an upper layer function of the second radio bearer function, and an application layer function (S1AP layer function) provided as an upper layer function of the IPSec layer function.

The radio base station eNB includes a second radio bearer function for setting the second radio bearer with the relay node RN, a wired bearer function for setting the wired bearer with the mobile switching center MME, an IP layer function provided as an upper layer function of the wired bearer function, and an SCTP layer function provided as an upper layer function of the IP layer function.

The mobile switching center MME includes a wired bearer function for setting the wired bearer with the radio base station eNB, an IP layer function provided as an upper layer function of the wired bearer function, an SCTP layer function provided as an upper layer function of the IP layer function, an IPSec layer function provided as an upper layer function of the SCTP layer function, and an application layer function (S1AP layer function) provided as an upper layer function of the IPSec layer function.

Herein, control signals (S1AP signals) are configured to be sent and received on the RNL session (S1AP) terminating between the application layer function (S1AP layer function) of the relay node RN and the application layer function (S1AP layer function) of the mobile switching center.

Keep-alive processing for the RNL session (S1AP) and the lower layer paths thereof are configured to be performed between the second radio bearer function of the relay node RN and the second radio bearer function of the radio base station eNB, and between the SCTP layer function of the radio base station eNB and the SCTP layer function of the mobile switching center MME.

Security processing is configured to be performed between the IPSec layer function of the relay node RN and the IPSec layer function of the mobile switching center MME.

Furthermore, security processing may be configured to be performed between the second radio bearer function of the relay node RN and the second radio bearer function of the radio base station eNB, and between the IP layer function of the radio base station eNB and the IP layer function of the mobile switching center MME.

According to the mobile communication system of this embodiment, it is possible to implement a configuration in which the mobile station sends and receives control signals with the mobile switching center MME via the plurality of devices (relay nodes RN and radio base stations eNB) provided with the functions of the radio base station eNB, without loading new S1AP functions.

(Mobile Communication System According to Fourth Embodiment of the Present Invention)

Figure 5:
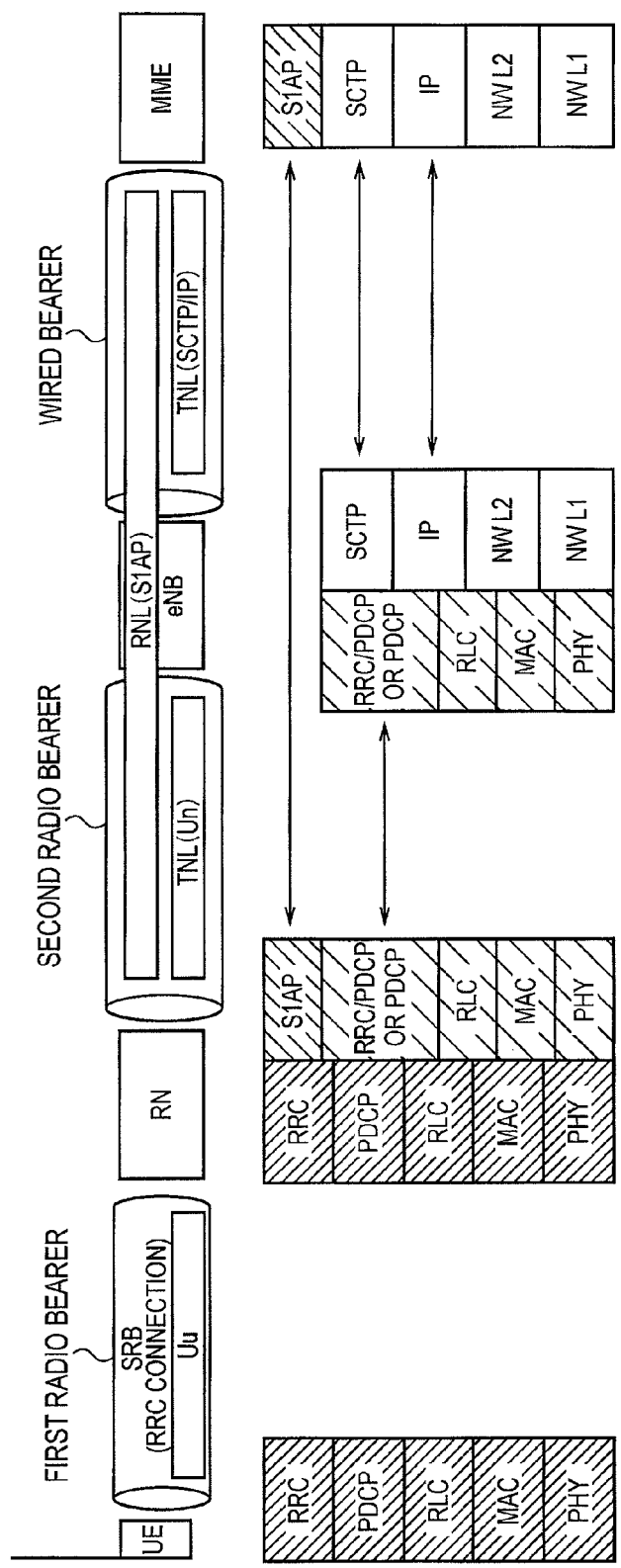
FIG. 5 is a diagram showing the protocol stack in the mobile communication system according to a fourth embodiment of the present invention.

A description will be provided for the mobile communication system according to a fourth embodiment of the present invention, with reference to FIG. 5. The mobile communication system according to the fourth embodiment of the present invention will be described below by focusing on the points of difference with the mobile communication system according to the first embodiment as described above.

As illustrated in FIG. 5, the relay node RN includes a first radio bearer function for setting the first radio bearer with the mobile station UE, a second radio bearer function for setting the second radio bearer with the radio base station eNB, and an application layer function (S1AP layer function) provided as an upper layer function of the second radio bearer function.

The radio base station eNB includes a second radio bearer function for setting the second radio bearer with the relay node RN, a wired bearer function for setting the wired bearer with the mobile switching center MME, an IP layer function provided as an upper layer function of the wired bearer function, and an SCTP layer function provided as an upper layer function of the IP layer function.

The mobile switching center MME includes a wired bearer function for setting the wired bearer with the radio base station eNB, an IP layer function provided as an upper layer function of the wired bearer function, an SCTP layer function provided as an upper layer function of the IP layer function, and an application layer function provided as an upper layer function of the SCTP layer function.

Herein, control signals (S1AP signals) are configured to be sent and received on the RNL session (S1AP) terminating between the application layer function (S1AP layer function) of the relay node RN and the application layer function (S1AP layer function) of the mobile switching center MME.

Keep-alive processing for the RNL session (S1AP) is configured to be performed between the second radio bearer function of the relay node RN and the second radio bearer function of the radio base station eNB, and between the SCTP layer function of the radio base station eNB and the SCTP layer function of the mobile switching center MME.

Security processing is configured to be performed between the second radio bearer function of the relay node RN and the second radio bearer function of the radio base station eNB, and between the IPSec function on the IP layer of the radio base station eNB and the IPSec function over the IP layer of the mobile switching center MME.

According to the mobile communication system of this embodiment, it is possible to implement a configuration in which the mobile station sends and receives control signals with the mobile switching center MME via the plurality of devices (the relay node RN and the radio base stations eNB) provided with the functions of the radio base stations eNB, without performing a major renovation of the protocol stack as used in the mobile communication system of the LTE scheme.

According to the mobile communication system of this embodiment, it is further possible to reduce the overhead assigned to when S1AP signals are transferred, because the application layer function (S1AP layer function) is provided in the relay node RN as an upper layer function of the second radio bearer function.

(Mobile Communication System According to Fifth Embodiment of the Present Invention)

Figure 6:
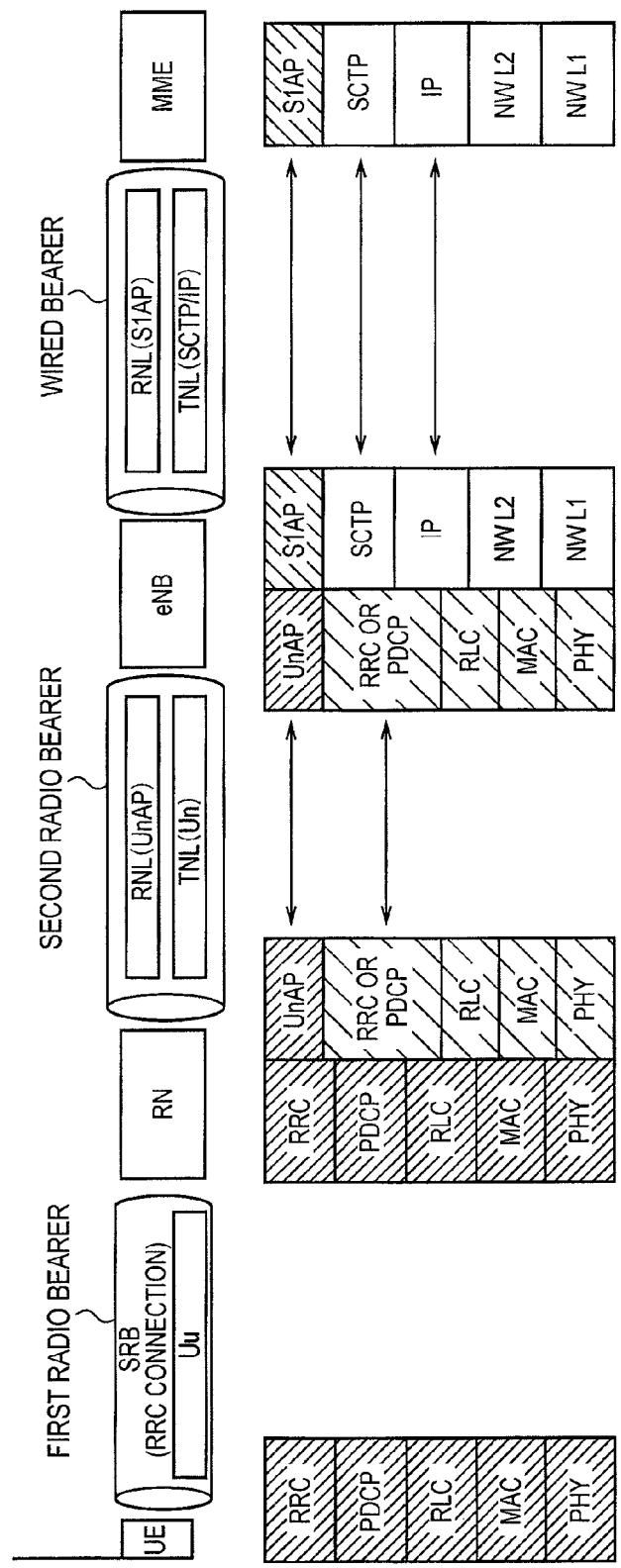
FIG. 6 is a diagram showing the protocol stack in the mobile communication system according to a fifth embodiment of the present invention.

A description will be provided for the mobile communication system according to a fifth embodiment of the present invention, with reference to FIG. 6. The mobile communication system according to the fifth embodiment of the present invention will be described below by focusing on the points of difference with the mobile communication system according to the first embodiment as described above.

As illustrated in FIG. 6, the relay node RN includes a first radio bearer function for setting the first radio bearer with the mobile station UE, a second radio bearer function for setting the second radio bearer with the radio base station eNB, and a first application layer function (UnAP layer function) provided as an upper layer function of the second radio bearer function.

The radio base station eNB includes a second radio bearer function for setting the second radio bearer with the relay node RN, a wired bearer function for setting the wired bearer with the mobile switching center MME, a first application layer function (UnAP layer function) provided as an upper layer function of the second radio bearer function, and a second application layer function (S1AP layer function) provided as an upper layer function of the wired bearer function.

The mobile switching center MME includes a wired bearer function for setting the wired bearer with the radio base station eNB, an IP layer function provided as an upper layer function of the wired bearer function, an SCTP layer function provided as an upper layer function of the IP layer function, and a second application layer function (S1AP layer function) provided as an upper layer function of the SCTP layer function.

Herein control signals (S1AP signals) are configured to be sent and received on an RNL session (UnAP) (the first session) terminating between the first application layer function (UnAP layer function) of the relay node RN and the first application layer function (UnAP layer function) of the radio base station eNB, and on an RNL session (S1AP) (the second session) terminating between the second application layer function (S1AP layer function) of the radio base station eNB and the second application layer function (S1AP layer function) of the mobile switching center MME.

Keep-alive processing for the RNL session (UnAP) is configured to be performed between the second radio bearer function of the relay node RN and the second radio bearer function of the radio base station eNB.

Keep-alive processing for the RNL session (S1AP) is configured to be performed between the SCTP layer function of the radio base station eNB and the SCTP layer function of the mobile switching center MME.

Security processing is configured to be performed between the second radio bearer function of the relay node RN and the second radio bearer function of the radio base station eNB, and between the IPSec function on the IP layer of the radio base station eNB and the IPSec function on the IP layer of the mobile switching center MME.

According to the mobile communication system of this embodiment, it is further possible to reduce the overhead assigned to when S1AP signals are transferred, because the application layer function (UnAP layer function) is provided in the relay node RN as an upper layer function of the second radio bearer function.

Also, according to the mobile communication system of this embodiment, it is possible to perform processing in the application layer (for example, filtering processing of paging signals) because an application layer function (UnAP layer function) is loaded into the radio base station eNB.

Note that operation of the above described the mobile station UE, the relay node RN, the radio base station eNB and the mobile switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the relay node RN, the radio base station eNB and the mobile switching center MME. Also, the storage medium and the processor may be provided in the mobile station UE, the relay node RN, the radio base station eNB and the mobile switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication system configured to send and receive control signals between a mobile station and a mobile switching center via a first radio bearer that is set between the mobile station and a relay node, a second radio bearer that is set between the relay node and a radio base station, and a wired bearer that is set between the radio base station and the mobile switching center, wherein wherein the relay node comprises:
    a first radio bearer function of the relay node for setting the first radio bearer;
    a second radio bearer function of the relay node for setting the second radio bearer; and
    a first layer function of the relay node provided as an upper layer function of the second radio bearer function of the relay node, wherein the radio base station comprises:
    a second radio bearer function of the radio base station for setting the second radio bearer;
    a wired bearer function of the radio base station for setting the wired barer;
    a first layer function of the radio base station provided as an upper layer function of the second radio bearer function of the radio base station; and
    a second layer function of the radio base station provided as an upper layer function of the wired bearer function of the radio base station, wherein the mobile switching center comprises:
    a wired bearer function of the mobile switching center for setting the wired barer; and
    a second layer function of the mobile switching center provided as an upper layer function of the wired bearer function of the mobile switching center, wherein the control signals are configured to be sent and received on a first session terminating between the first layer function of the relay node and the first layer function of the radio base station and a second session terminating between the second layer function of the radio base station and the second layer function of the mobile switching center, wherein keep-alive processing for the first session is configured to be performed between the first layer function of the relay node and the first layer function of the radio base station, wherein keep-alive processing for the second session is configured to be performed between the second layer function of the radio base station and the second layer function of the mobile switching center, wherein security processing is configured to be performed between the first layer function of the relay node and the first layer function of the radio base station, and wherein security processing is configured to be performed between the second layer function of the radio base station and the second layer function of the mobile switching center.

* * * * *